United States Patent
Kruecker et al.

(10) Patent No.: US 10,977,787 B2
(45) Date of Patent: Apr. 13, 2021

(54) FEEDBACK FOR MULTI-MODALITY AUTO-REGISTRATION

(71) Applicant: KONINKLIJKE PHILIPS N.V., Eindhoven (NL)

(72) Inventors: Jochen Kruecker, Washington, DC (US); Amir Mohammad Tahmasebi Maraghoosh, Melrose, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/534,782

(22) PCT Filed: Nov. 30, 2015

(86) PCT No.: PCT/IB2015/059193
§ 371 (c)(1),
(2) Date: Jun. 9, 2017

(87) PCT Pub. No.: WO2016/092408
PCT Pub. Date: Jun. 16, 2016

(65) Prior Publication Data
US 2018/0268541 A1    Sep. 20, 2018

Related U.S. Application Data

(60) Provisional application No. 62/089,436, filed on Dec. 9, 2014.

(51) Int. Cl.
G06K 9/00    (2006.01)
G06T 7/00    (2017.01)
(Continued)

(52) U.S. Cl.
CPC ............ *G06T 7/0012* (2013.01); *G06F 3/017* (2013.01); *G06F 3/041* (2013.01); *G06T 7/0002* (2013.01);
(Continued)

(58) Field of Classification Search
CPC ......... G06T 7/0012; G06T 2207/10136; G06T 2207/30004; G06T 7/33;
(Continued)

(56) References Cited

U.S. PATENT DOCUMENTS 5,999,840 A * 12/1999 Grimson ............... G06T 3/0068
                                                             600/424
7,991,450 B2    8/2011 Virtue et al.
(Continued)

OTHER PUBLICATIONS

Kadoury, S. et al., "A model based registration approach of preoperative MRI with 3D ultrasound of the liver for Interventional guidance procedures", Biomedical Imaging (ISBI), 2012 9th IEEE International Symposium on May 2, 2012, pp. 952-995.
(Continued)

*Primary Examiner* — Guillermo M Rivera-Martinez

(57) ABSTRACT

A system for registration feedback includes a segmentation module configured to segment a relevant three-dimensional structure in a first image to be registered and to segment a same relevant structure in a second image to be registered to provide three-dimensional segmentations of the first and second images. A registration module is configured to register the three-dimensional segmentations of the first and second images by applying a registration transformation to one of the three-dimensional segmentations to map one three-dimensional segmentation onto the coordinate space of the other. A display is configured to jointly display the three-dimensional segmentations of the first and second images, each of the three-dimensional segmentations having a different visual characteristic to permit identification of each of the three-dimensional segmentations in a joint display image such that registration between the three-dimensional segmentations in the joint display image provides an immediate indication of registration quality to a user.

18 Claims, 6 Drawing Sheets

(51) Int. Cl.
*G06T 7/33* (2017.01)
*G06T 7/174* (2017.01)
*G06F 3/01* (2006.01)
*G06F 3/041* (2006.01)

(52) U.S. Cl.
CPC .............. *G06T 7/174* (2017.01); *G06T 7/344* (2017.01); *G06T 2200/24* (2013.01); *G06T 2207/10081* (2013.01); *G06T 2207/10088* (2013.01); *G06T 2207/10136* (2013.01); *G06T 2207/20221* (2013.01)

(58) Field of Classification Search
CPC . G06T 2207/10072; G06T 2207/10132; G06T 2207/20048; G06T 2210/41; G06T 3/0068; G06T 7/11; G06T 7/30; G06T 17/00; G06T 2207/30101; G01S 15/8993; G06K 2009/00932; G06K 2209/05; G06K 9/32
See application file for complete search history.

(56) References Cited

U.S. PATENT DOCUMENTS

| | | | |
|---|---|---|---|
| 2003/0083759 A1 | 5/2003 | Ditt et al. | |
| 2003/0208116 A1* | 11/2003 | Liang | A61B 5/055 600/407 |
| 2007/0135803 A1* | 6/2007 | Belson | A61B 1/00154 606/1 |
| 2008/0008401 A1 | 1/2008 | Zhu et al. | |
| 2008/0077158 A1* | 3/2008 | Haider | A61B 17/15 606/130 |
| 2008/0095421 A1* | 4/2008 | Sun | A61B 6/12 382/131 |
| 2008/0249414 A1* | 10/2008 | Yang | A61B 8/483 600/445 |
| 2009/0097723 A1 | 4/2009 | Washburn et al. | |
| 2009/0303252 A1 | 12/2009 | Hyun et al. | |
| 2010/0152570 A1* | 6/2010 | Navab | A61B 6/463 600/411 |
| 2012/0314021 A1* | 12/2012 | Tsang | H04N 5/89 348/40 |
| 2013/0060146 A1* | 3/2013 | Yang | A61B 5/055 600/476 |
| 2016/0007970 A1 | 1/2016 | Dufour et al. | |
| 2016/0070436 A1* | 3/2016 | Thomas | A61B 5/055 715/771 |
| 2016/0113632 A1* | 4/2016 | Ribes | A61B 8/0891 600/440 |
| 2016/0189381 A1* | 6/2016 | Rhoads | G06T 7/579 382/103 |

OTHER PUBLICATIONS

Narayanan, R. et al., "MRI/TRUS Fusion for Prostate Biopsy: Early Results and Clinical Feasibility", Proceedings 17th Scientific meeting, International Society for Magnetic Resonance in Medicine, Apr. 18, 2009, pp. 2247-2247.n.

Salvi, J. et al., "A review of recent range image registration methods with accuracy evaluation", Image and Vision Computing (2006), www.sciencedirect.com.

Registering Multimodal 3-D Medical Images. MATLAB & Simulink Example.

* cited by examiner

FEEDBACK FOR MULTI-MODALITY AUTO-REGISTRATION

CROSS-REFERENCE TO PRIOR APPLICATIONS

This application is the U.S. National Phase application under 35 U.S.C. § 371 of International Application No. PCT/IB2015/059193, filed on Nov. 30, 2015, which claims the benefit of U.S. Provisional Application No. 62/089,436, filed on Dec. 9, 2014. This application is hereby incorporated by reference herein.

BACKGROUND

Technical Field

This disclosure relates to image registration and more particularly to a system and method for registering images that enable an instant evaluation of registration quality and accuracy.

Description of the Related Art

Automatic registration and fusion of multiple imaging modalities is beneficial for various diagnostic and interventional procedures. Specifically, the registration of low-cost, real-time imaging such as ultrasound (US) with prior 3D imaging such as computed tomography (CT) or magnetic resonance imaging (MRI) is desirable. Spatial tracking (e.g., using electromagnetic (EM) tracking) of ultrasound probes has been introduced to facilitate e.g., US-CT registration. However, the remaining task of registering the prior CT image with the EM tracking coordinate system requires either obtaining a new CT scan with EM trackers or fiducial markers on the patient or a time-consuming manual registration procedure in which the user identifies common points, landmarks, or image plane in real-time tracked US and prior CT.

Current approaches for displaying a resulting registration transformation include mapping static images used for registration onto one another using a registration transformation (e.g., mapping an US image onto a CT image), and displaying the mapped images either side-by-side, or in a single "fused" image. Another method includes letting the operator apply the registration transformation during live ultrasound scanning, and displaying the corresponding cross section of the other image (e.g., CT) simultaneously on the screen. These approaches have drawbacks and are not efficient. Specifically, the operator is not used to or trained in reading "fused" images and may not be able to tell if the fused images show an "acceptable" registration. The fused or side-by-side display typically only shows a single 2D slice or 2 or 3 orthogonal slices from the US and CT images. These slices may not contain the image information or landmarks that would allow the operator to assess the registration quality. If the operator wanted to see additional slices, the operator would need to manually select different slices for display. This takes additional time.

3D volume rendering of the entire images (fused or side-by-side typically only renders the "outside" areas of the image volumes. In addition, the rendering process would be difficult to adjust manually, and many relevant landmarks may be obscured by other, irrelevant image information. This also takes additional time, and the operator would need to find relevant landmarks during live scanning that would permit the operator to assess the registration. Also, respiratory motion of the patient may change the registration quality during the scanning, potentially causing additional confusion.

Automatic registration of 3D ultrasound with CT results may be provided using a transformation T for transforming points from a coordinate system of one of the images onto a coordinate system of the other image. This enables the mapping of the images onto one another (or "fusing" the images). The output of the automatic registration depends on the inputs, which include the two images (e.g. CT and ultrasound), and possibly additional information provided by the operator (e.g., an initial estimate of the transformation). Because the image contents of the inputs and the quality of the operator input are highly variable, the quality of the output is also difficult to predict, thus requiring the operator to review the result and either "accept" it or "reject" it and start the registration process anew.

SUMMARY

In accordance with the present principles, a system for registration feedback includes a segmentation module configured to segment a relevant three-dimensional structure in a first image to be registered and to segment a same relevant structure in a second image to be registered to provide three-dimensional segmentations of the first and second images. A registration module is configured to register the three-dimensional segmentations of the first and second images by applying a registration transformation to one of the three-dimensional segmentations to map one three-dimensional segmentation onto coordinate space of the other. A display is configured to jointly display the three-dimensional segmentations of the first and second images, each of the three-dimensional segmentations having a different visual characteristic to permit identification of each of the three-dimensional segmentations in a joint display image such that registration between the three-dimensional segmentations in the joint display image provides an immediate indication of registration quality to a user.

Another system for registration feedback includes a processor and memory coupled to the processor. The memory includes a segmentation module configured to segment a relevant three-dimensional structure in a first image to be registered and to segment a same relevant structure in a second image to be registered to provide three-dimensional segmentations of the first and second images, and a registration module configured to register the three-dimensional segmentations of the first and second images by applying a registration transformation to one of the three-dimensional segmentations to map one three-dimensional segmentation onto coordinate space of the other. A display is configured to jointly display the three-dimensional segmentations of the first and second images, each of the three-dimensional segmentations having a different visual characteristic to permit identification of each of the three-dimensional segmentations in a joint display image such that registration between the three-dimensional segmentations in the joint display image provides an immediate indication of registration quality to a user. A user interface is configured to permit the user to select different views of the joint display image to allow exploration of relative alignment in different perspectives.

A method for registration feedback includes segmenting a relevant three-dimensional structure in a first image to be registered and a same relevant structure in a second image to be registered to provide three-dimensional segmentations of the first and second images; registering the three-dimensional segmentations of the first and second images by applying a registration transformation to one of the three-dimensional segmentations to map one three-dimensional segmentation onto coordinate space of the other; and jointly displaying the three-dimensional segmentations of the first and second images, each of the three-dimensional segmentations having a different visual characteristic to permit identification of each of the three-dimensional segmentations in a joint display image such that registration between the three-dimensional segmentations in the joint display image provides an immediate indication of registration quality to a user.

These and other objects, features and advantages of the present disclosure will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF EMBODIMENTS

Figure 1:
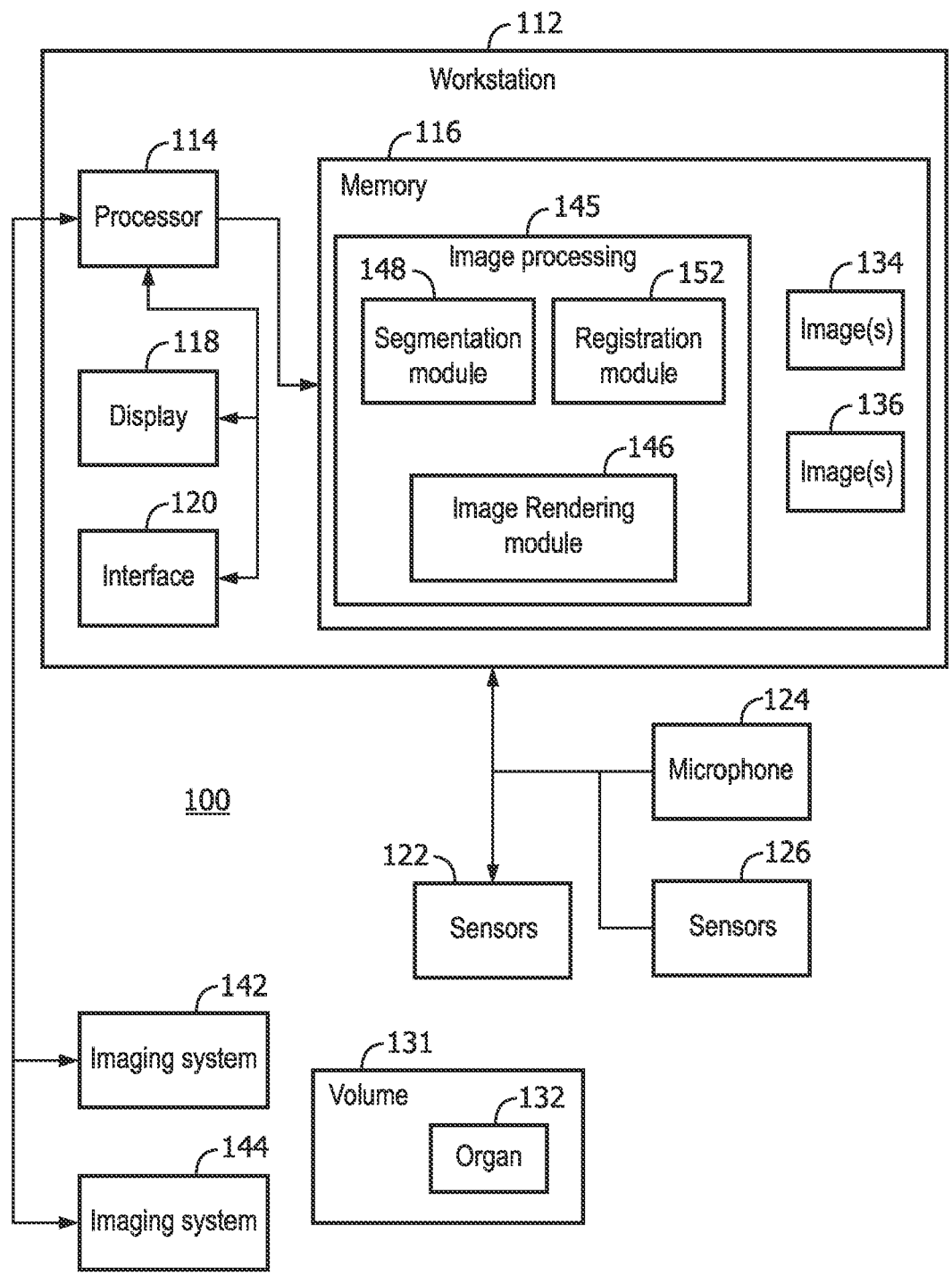
FIG. 1 is a block/flow diagram showing a system for visually determining image registration quality in accordance with one embodiment.

In accordance with the present principles, system and methods for displaying and visualizing registration results are provided. In accordance with particularly useful embodiments, an operator can decide quickly, correctly and with confidence whether the registration is acceptable. To overcome the drawbacks of the prior art, the present principles provide a display of 3D segmented information that shows the operator all of the relevant information in a single view.

Several approaches can be realized in a user interface for an auto-registration application in accordance with the present principles. One approach includes segmentation of vessel structures in an ultrasound (US) image and a computed tomography (CT) image during the registration, and visualizing both vessel trees (or other structures) in different colors in a 3D rendering. Another approach includes surface segmentation of organs in a region of interest in the US and CT images, and again visualizing both segmentations in different colors in a 3D rendering. In both cases, the distances and alignment of all the segmented structures can be appreciated by the operator in a single image, and can serve to assess registration quality. Another approach includes a 3D rendering of the position of the ultrasound probe used for acquiring the 3D US image relative to a rendering of the patient's skin surface based on the CT scan. A quick look at this single rendering will tell the operator if the overall rotation and translation of the registration is correct.

It should be understood that the present invention will be described in terms of medical images; however, the teachings of the present invention are much broader and are applicable to any images. In some embodiments, the present principles are employed in tracking or analyzing complex biological or mechanical systems. In particular, the present principles are applicable to internal tracking procedures of biological systems, procedures in all areas of the body such as the lungs, gastro-intestinal tract, excretory organs, blood vessels, etc. The elements depicted in the FIGS. may be implemented in various combinations of hardware and software and provide functions which may be combined in a single element or multiple elements.

The functions of the various elements shown in the FIGS. can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), non-volatile storage, etc.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable storage media and so executed by a computer or processor, whether or not such computer or processor is explicitly shown.

Furthermore, embodiments of the present invention can take the form of a computer program product accessible from a computer-usable or computer-readable storage medium providing program code for use by or in connection with a computer or any instruction execution system. For the purposes of this description, a computer-usable or computer readable storage medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W), Blu-Ray™ and DVD.

Referring now to the drawings in which like numerals represent the same or similar elements and initially to FIG. 1, a system 100 for visually determining image registration quality is illustratively shown in accordance with one embodiment. System 100 may include a workstation or console 112 from which a procedure is supervised and/or managed. Workstation 112 preferably includes one or more processors 114 and memory 116 for storing programs and applications.

In one embodiment, memory 116 may store an image processing module 145 configured to receive images from different imaging modalities 142, 144 imaging a same or partially the same volume 131 (although other scenarios are contemplated). The imaging modalities may include any combination of two or more imaging modalities, such as US, CT, magnetic resonance imaging (MRI), fluoroscopy, etc. Images 134, 136 of volume 131 are stored in the memory 116. Volume 131 includes points or interest, relevant structures, organs 132, partial organs, etc. It should be noted that while imaging modalities 142 and 144 are depicted in FIG. 1, no imaging modalities, additional imaging modalities or only one imaging modality may be present as the system 100 may operate on stored images from whatever source.

An image segmentation module 148 provides segmentation of organs in the images 134, 136. The image segmentation preferably includes 3D segmentation of relevant structures involved in a registration process (e.g., vessels, or organ surfaces), i.e. creating segmentations based on images 134, 136. The segmented organs or points of interest in images 134, 136 are registered to one another using a registration module 152. The registration module 152 includes one or more registration programs capable of determining a transformation between the images 134, 136 and aligning the points or interest or organs in the images. By applying a registration transformation T to the segmentation(s) of one of the images (e.g., image 136), the image (136) is mapped onto the coordinate space of the other image (134).

An image rendering module 146 renders the registered images on top of each other in three dimensions for display on a display device 118. Workstation 112 includes the display 118 for viewing the images 134, 136 of a subject (patient) or volume 131 and may include the images 134, 136 as different colors or textures to differentiate between the imaging modalities. Display 118 may also permit a user to interact with the workstation 112 and its components and functions, or any other element within the system 100. This is further facilitated by an interface 120 which may include a keyboard, mouse, a joystick, a haptic device, or any other peripheral or control to permit user feedback from and interaction with the workstation 112. Other options for interface 120 may include touch screen or touch-free sensors (such as the Kinect™ by Microsoft®) to modify a view perspective. Touch free sensors 122 may be employed to detect and interpret operator gestures in free space. Other input options may include a microphone 124 to receive verbal/acoustic input from the operator, or using accelerometer or other sensors 126 that may be attached to the operator (e.g., a wrist band, etc.) for gesture detection.

The display 118 provides a joint visualization of 3D segmentations obtained from both images 134, 136 involved in an auto-registration (e.g. 3D US and CT), to facilitate quick and reliable assessment of the registration quality by an operator. In particular, sparsity of the displayed information (segmentations only, as opposed to the whole images), permits the operator to see all the relevant information (full 3D view), which is not the case when displaying renderings of the underlying images. The image rendering module 146 renders different views and permits the operator to choose from the different views using the display 118 and/or the interface 120. The operator can, e.g., modify view direction, translation and zoom of the segmentations to allow full exploration of the relative alignment of the segmented and registered structures.

In one embodiment, the feedback provided to the operator may also be quantitative or numeric, e.g., the mean, median, or maximum distance between segmented structures, and a number, length, surface or volume of the segmented structures. The rendering can be animated, showing different view perspectives over time (e.g., the virtual "camera" creating the rendering rotating around the segmented structures). In this way, the operator does not have to provide any input to change the view perspective.

In accordance with the present principles, 3D segmentation of relevant structures involved in the registration process (e.g., vessels, or organ surfaces) creates segmentations $S_A$ and $S_B$, based on images A and B (images 134 and 136), respectively. The registration transformation T is applied to the segmentation(s) from one of the images (A) to map it onto the coordinate space of the other image (B) (or vice versa), e.g., creating $S_{A\_in\_B}=T \times S_A$. The 3D segmentations $S_{A\_in\_B}$ and $S_B$ are jointly displayed in a 3D rendering, with different colors or textures for the $S_{A\_in\_B}$ and $S_B$.

The segmentation module 148 segments relevant structures from the two images 134, 136 to be registered. The segmentations may be obtained before or during the registration process using the registration module 152 and may be employed by the registration algorithm or method to determine an optimal registration between the two images 134, 136. Any method known in the art for creating the segmentations can be employed. The segmented structures can be, e.g., surfaces or partial surfaces of organs and body structures; blood vessels; bifurcation points of blood vessels or airways; other common landmarks that can be represented as 1-dimensional (1D), 2D or 3D objects, such as, e.g., implanted surgical clips (1D points) visible in all imaging modalities, implanted catheters (2D line), etc.

One method for segmenting organ surfaces includes, e.g., thresholding of the image or providing an image intensity gradient. This includes retaining only points that show image intensities or intensity gradients above or below a certain threshold. Other segmentation techniques may also be employed.

The segmented structures in images 134, and 136 are then represented as sparse binary volumes (e.g., volumes having "1" values for voxels that are part of the segmentation, and "0" voxels for all other areas, not part of the segmentation); as point clouds (e.g., sets of 3D point coordinates corresponding to the points that are part of the segmentation); or as surface meshes (e.g., point clouds with additional information about which points are connected by edges to form surface patches—the entire mesh thus representing the surface area of a segmentation). The segmented structures are then rendered by the image rendering module 144 using 3D surface rendering methods, which may include techniques known in the art. In this way, the operator is provided with images that permit an immediate appreciation for the quality of alignment between the segmentations from the images 134, 136.

Figure 2:
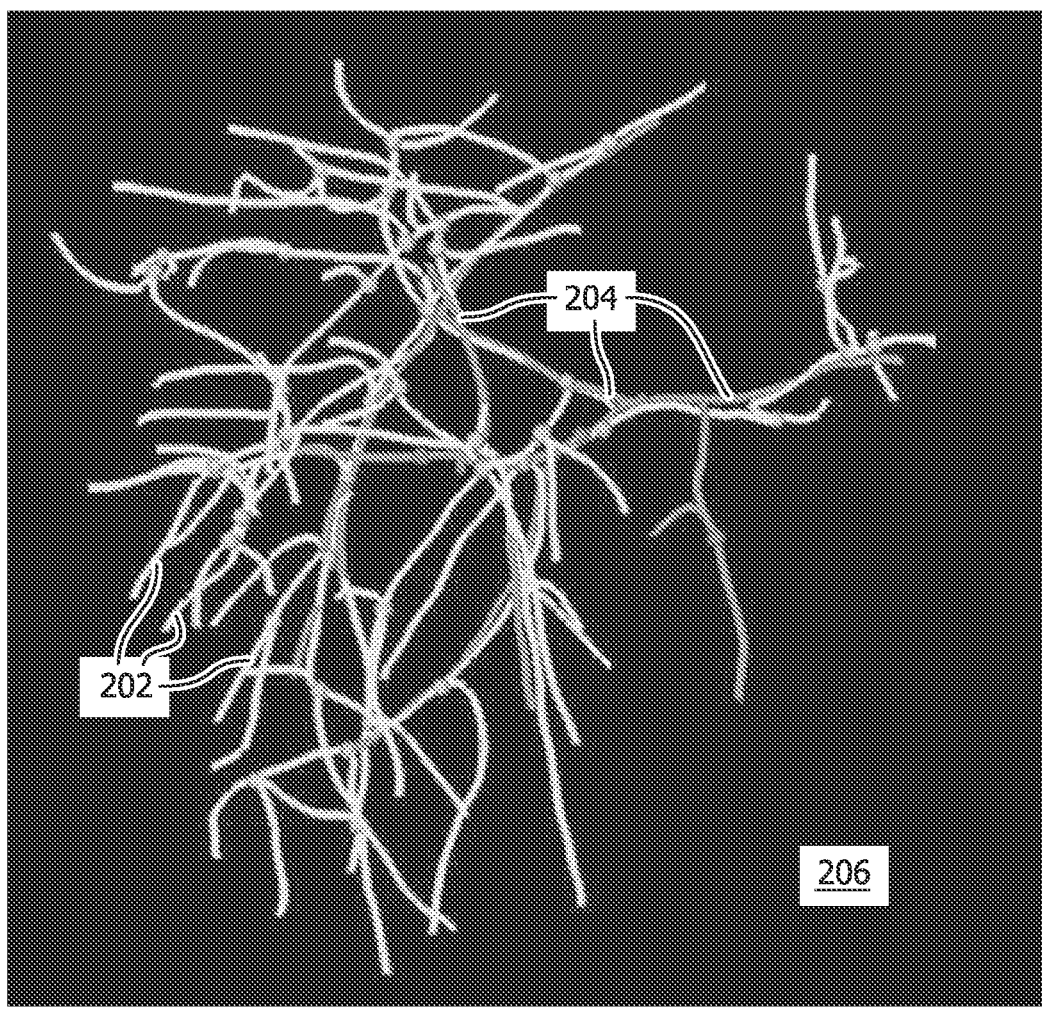
FIG. 2 is a rendering showing blood vessel segmentations extracted from a CT image and from an ultrasound image of a same patient and registered onto the CT scan to show alignment in accordance with one embodiment.

Referring to FIG. 2, a rendering of blood vessels 202 extracted from a CT image, and blood vessels 204 extracted from an ultrasound image of a same patient are illustratively registered onto a CT scan rendering 206. An operator can see the entire 3D segmentation structure, and can appreciate quickly that the ultrasound vessels are well aligned with their CT counterparts. The CT scan rendering 206 is generated for a registration method that employs vessel segmentations to compute the registration. In one embodiment, the operator can "click and drag" the rendering 206 to rotate or otherwise change the view perspective. In this way, those vessel elements that are currently obscured by other vessels in front of them can be more easily viewed in a current view perspective.

Figure 3:
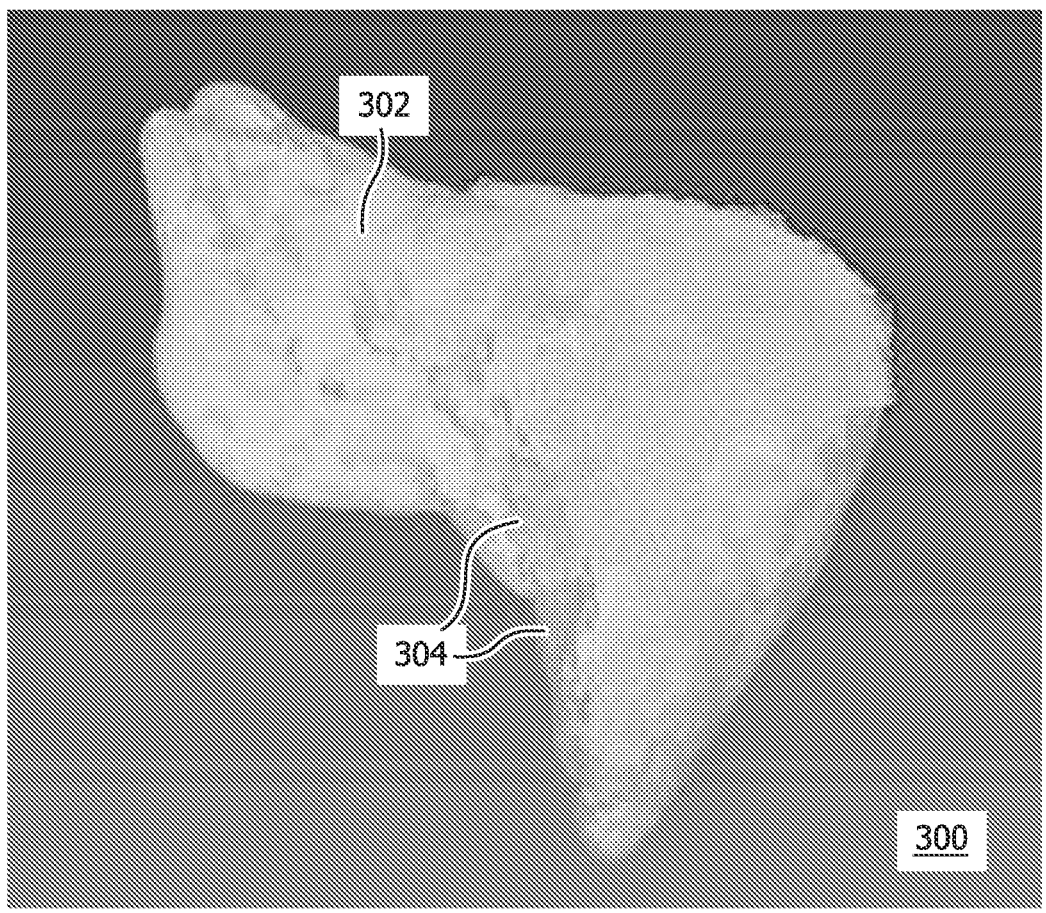
FIG. 3 is a rendering showing surface segmentation for computing registration between a complete organ surface segmentation extracted from CT, and a partial organ surface segmentation extracted from ultrasound, registered onto CT in accordance with another embodiment.

Referring to FIG. 3, a result rendering 300 generated for an algorithm employing surface segmentation for computing the registration is shown. The rendering shows a complete organ surface segmentation extracted from CT (lighter regions 302), and a partial organ surface segmentation from ultrasound (darker regions 304), registered onto CT. The fit of the entire darker surfaces 304 onto the lighter surfaces 302 can be quickly appreciated by the operator.

Figure 4:
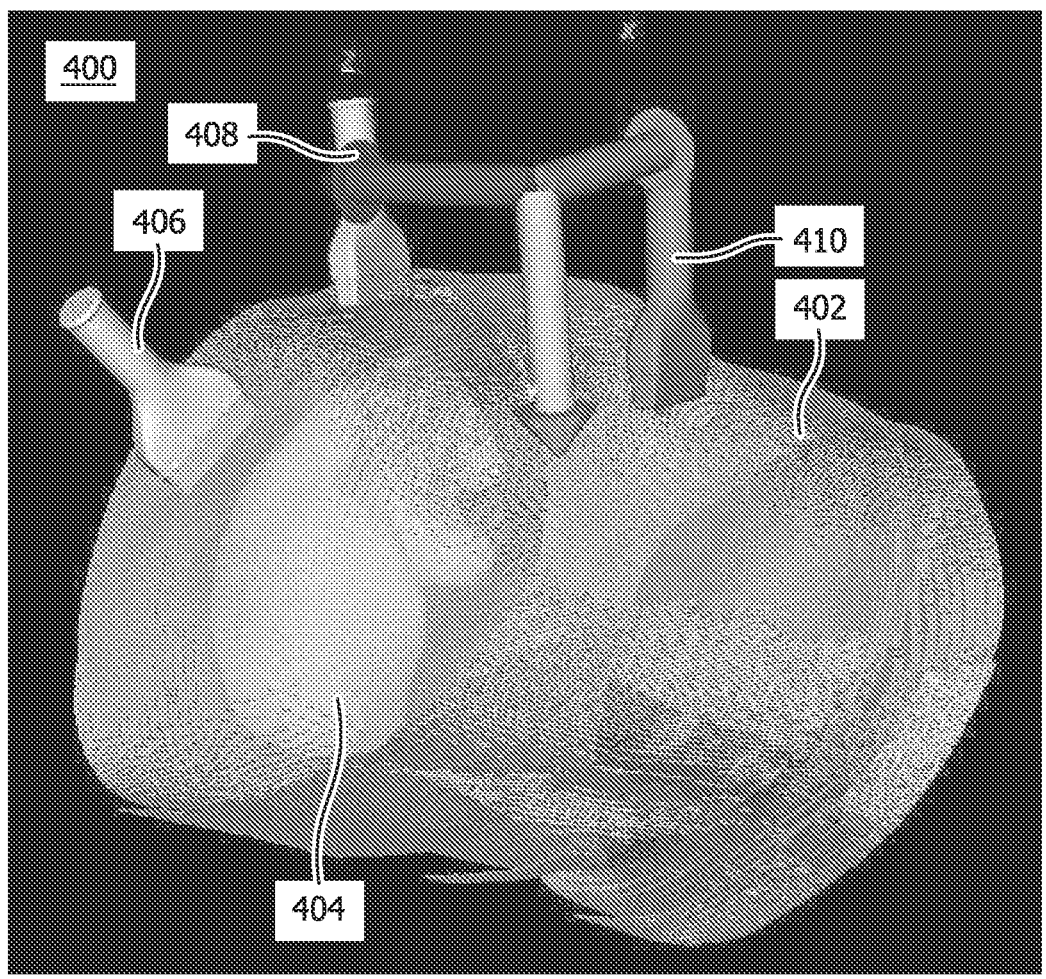
FIG. 4 is a rendering showing skin and a liver of a patient, based on segmentations extracted from CT and a model of a tracked ultrasound probe during acquisition of an ultrasound image in accordance with another embodiment.

Referring to FIG. 4, a rendering 400 shows skin 402 and a liver 404 of a patient registered based on segmentations extracted from CT. In addition, a model 406 of a tracked ultrasound probe during acquisition of a 3D ultrasound image is rendered, in a position given by a computed US-CT registration transformation (T). This rendering also indicates additional locations 408, 410 of the tracked ultrasound probe model 406 (as captured during other steps in the registration process). The gross location of the ultrasound probe(s) relative to the patient surface rendering (skin 402) lets the operator quickly assess whether the registration result is reasonable.

Note that the rendering of the position of probes used during imaging is not part of the images themselves. Instead the position information for the probes includes additional information obtained, e.g., using EM tracking or other tracking of the probes.

Figure 5:
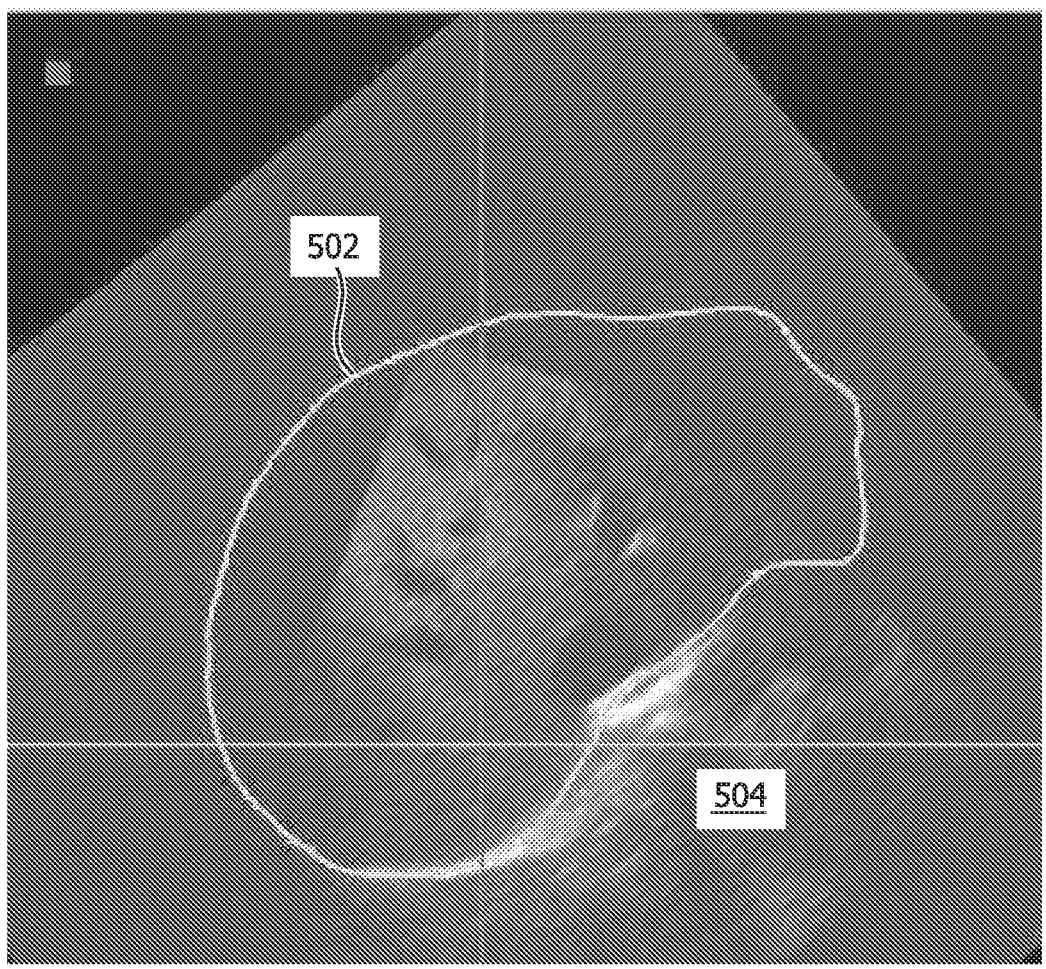
FIG. 5 is a rendering showing an outline segmentation from one image on top of another image in accordance with another embodiment.

Referring to FIG. 5, another embodiment employs a segmentation 502 from one image (e.g., CT organ segmented surface) rendered on top of another image 504 (e.g., an ultrasound image). The rendering of FIG. 5 is in a coordinate system of the CT image (502) but could alternatively be provided in the ultrasound coordinate system. Several such renderings, for different cross-sections through the image volumes, could be provided concurrently.

The present principles provide specific visual feedback to the user, e.g., segmented structures from two or more images, displayed with differentiated characteristics, such as, different colors or textures. The present principles can be applied in all scenarios where automatic image registration is employed. Specifically, the present embodiments find application, e.g., in a feature on ultrasound systems (for CT-US registration), but can also be used on other systems involving multi-modality registration (e.g., prostate procedures or the like).

Figure 6:
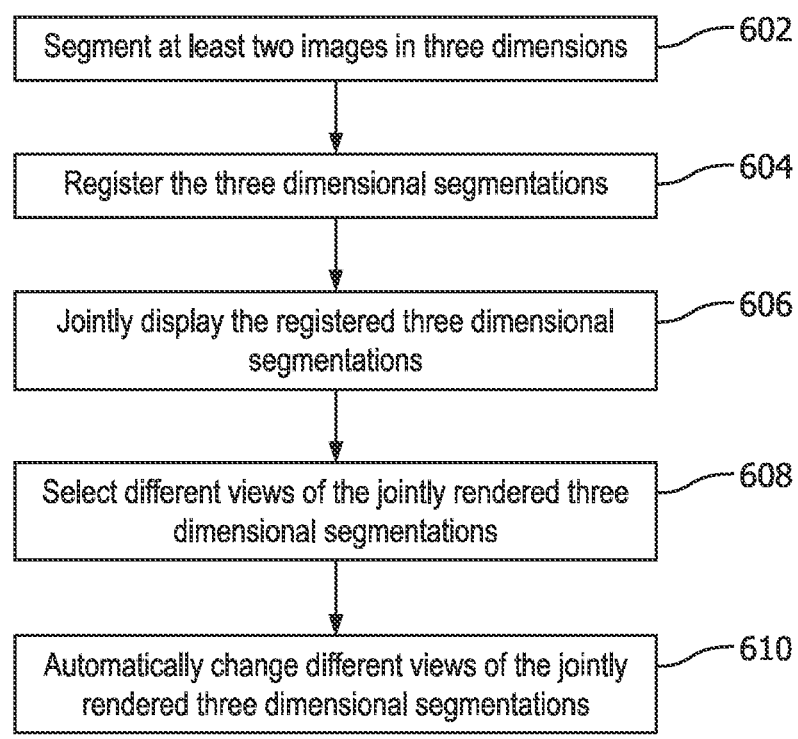
FIG. 6 is a block/flow diagram showing a method for visually determining image registration quality in accordance with illustrative embodiments.

Referring to FIG. 6, a method for registration feedback is shown in accordance with illustrative embodiments. In block 602, a relevant three-dimensional structure is segmented in a first image to be registered, and a same relevant structure is segmented in a second image to be registered to provide three-dimensional segmentations of the first and second images. Segmentation may be performed using intensity or gradient thresholding although any number of segmentation techniques may be employed. The first and second images may be acquired with the same or different modalities. Segmentation extracts the surface points, bifurcation points, or other relevant 1D, 2D or 3D landmarks from images.

The images may include 3D representations of an organ (s)/subject being imaged, images of the same organ (or part of an organ) of a same patient in different imaging modalities, images of the same organ (or part of an organ) of two different patients, images of an organ and a surface of the organ of a same patient in different imaging modalities, an outline of an image of an organ against a volume image in different imaging modalities, a three-dimensional rendering of a position of a probe used for acquiring the image relative to a rendering of a patient's skin surface based on a scan rendering the other image, etc.

In block 604, the three-dimensional segmentations of the first and second images are registered by applying a registration transformation to one of the three-dimensional segmentations to map one three-dimensional segmentation onto coordinate space of the other. The registration or coordinate transformation may be computed in a number of ways, e.g., by comparing the images during segmentation or by comparing comparable images in a series of images, etc.

In block 606, the three-dimensional segmentations of the first and second images are jointly displayed. Each of the three-dimensional segmentations includes a different visual characteristic to permit identification of each of the three-dimensional segmentations in a joint display image such that registration between the three-dimensional segmentations in the joint display image provides an immediate indication of registration quality to a user. The visual characteristic may include colors, textures or any other visually distinguishing features that permit identification of voxels or pixels or each individual image. The display may include or provide the rendering of a position of a probe used for acquiring the image relative to a rendering of a patient's skin or other surface. In this way, an image, an image-derived segmentation or other procedure-specific information such as the probe positions/renderings, etc. may be employed to evaluate the registration.

In block 608, different views of the joint display image may be selected to permit exploration of relative alignment in different perspectives. The joint image may be translated rotated, zoomed, etc. to analyze different view angles to determine the quality of the registration, taking advantage of the three-dimensional aspect to determine overlap and distances between the segmented images. In block 610, in one embodiment, the joint display image may be automatically changed to different perspectives over time. This provides a hands free approach that includes different perspectives for the same registration.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) no specific sequence of acts is intended to be required unless specifically indicated.

Having described preferred embodiments for feedback for multi-modality auto-registration (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the embodiments disclosed herein as outlined by the appended claims. Having thus described the details and particularity required by the patent laws, what is claimed and desired protected by Letters Patent is set forth in the appended claims.

The invention claimed is:

1. A system for registration feedback, comprising:
a segmentation module configured to segment a relevant three-dimensional structure in a first image to be registered and to segment a same relevant structure in a second image to be registered to provide three-dimensional segmentations of the first and second images;
a registration module configured to register the three-dimensional segmentations of the first and second images by applying a registration transformation to one of the three-dimensional segmentations to map one three-dimensional segmentation onto coordinate space of the other; and
a display configured to jointly display the three-dimensional segmentations of the first and second images, each of the three-dimensional segmentations having a different visual characteristic to permit identification of each of the three-dimensional segmentations in a joint display image such that registration between the three-dimensional segmentations in the joint display image provides an immediate indication of registration quality to a user
wherein the joint display image is animated to show different perspectives over time without user intervention, the different perspectives being configured to explore relative alignment and determination of quality of registration in the different perspectives.

2. The system as recited in claim 1, wherein the segmentation module is configured to segment an organ or part of an organ in the first and second images.

3. The system as recited in claim 1, wherein the first and second images include images from different imaging modalities.

4. The system as recited in claim 1, further comprising a user control configured to permit the user to select different views of the joint display image to allow exploration of relative alignment in different perspectives.

5. The system as recited in claim 4, wherein the user control includes sensors to measure gestures of the user in free space.

6. The system as recited in claim 4, wherein the user control includes one of touch screen controls or acoustic controls.

7. The system as recited in claim 1, wherein the visual characteristic includes colors or textures.

8. The system as recited in claim 1, wherein additional information is employed that includes a tracked position of a probe used for acquiring an image relative to a rendering of a patient's skin or other surface.

9. A system for registration feedback, comprising:
a processor;
memory coupled to the processor, the memory including:
a segmentation module configured to segment a relevant three-dimensional structure in a first image to be registered and to segment a same relevant structure in a second image to be registered to provide three-dimensional segmentations of the first and second images; and
a registration module configured to register the three-dimensional segmentations of the first and second images by applying a registration transformation to one of the three-dimensional segmentations to map one three-dimensional segmentation onto coordinate space of the other;
a display configured to jointly display the three-dimensional segmentations of the first and second images, each of the three-dimensional segmentations having a different visual characteristic to permit identification of each of the three-dimensional segmentations in a joint display image such that registration between the three-dimensional segmentations in the joint display image provides an immediate indication of registration quality to a user; and
a user interface configured to animate all or part of the display to show different perspectives over time without user intervention, the different perspectives being configured to explore relative alignment and determination of quality of registration in the different perspectives.

10. The system as recited in claim 9, wherein the segmentation module is configured to segment an organ or part of an organ in the first and second images.

11. The system as recited in claim 9, wherein the first and second images include images from different imaging modalities.

12. The system as recited in claim 9, wherein the user interface includes one or more of sensors to measure gestures of the user in free space, touch screen controls or acoustic controls.

13. The system as recited in claim 9, wherein the visual characteristic includes colors or textures.

14. The system as recited in claim 9, wherein additional information is employed that includes a tracked position of a probe used for acquiring an image relative to a rendering of a patient's skin or other surface.

15. A method for registration feedback, comprising:
segmenting a relevant three-dimensional structure in a first image to be registered and a same relevant structure in a second image to be registered to provide three-dimensional segmentations of the first and second images;
registering the three-dimensional segmentations of the first and second images by applying a registration transformation to one of the three-dimensional segmentations to map one three-dimensional segmentation onto coordinate space of the other; and
jointly displaying the three-dimensional segmentations of the first and second images, each of the three-dimensional segmentations having a different visual characteristic to permit identification of each of the three-dimensional segmentations in a joint display image such that registration between the three-dimensional segmentations in the joint display image provides an immediate indication of registration quality to a user; and
animating the joint display image to show different perspectives over time without user intervention, the different perspectives being configured to explore relative alignment and determination of quality of registration in the different perspectives.

16. The method as recited in claim 15, further comprising selecting different views of the joint display image to permit exploration of relative alignment in different perspectives.

17. The method as recited in claim 15, wherein the visual characteristic includes colors or textures.

18. The method as recited in claim 15, wherein additional information is employed that includes a tracked position of a probe used for acquiring an image relative to a rendering of a patient's skin or other surface.

* * * * *